No. 751,144. PATENTED FEB. 2, 1904.
F. F. BRUSH.
STEAM TRAP.
APPLICATION FILED FEB. 19, 1903.
NO MODEL.

WITNESSES
T. F. Massey
Lotta Lee Hayton.

INVENTOR
Frederick F. Brush
By
Parker & Burton Attorneys.

No. 751,144. Patented February 2, 1904.

UNITED STATES PATENT OFFICE.

FREDERICK F. BRUSH, OF DETROIT, MICHIGAN.

STEAM-TRAP.

SPECIFICATION forming part of Letters Patent No. 751,144, dated February 2, 1904.

Application filed February 19, 1903. Serial No. 144,094. (No model.)

*To all whom it may concern:*

Be it known that I, FREDERICK F. BRUSH, a citizen of the United States, residing at Detroit, county of Wayne, State of Michigan, have invented a certain new and useful Improvement in Steam-Traps; and I declare the following to be a full, clear, and exact description of the invention, such as will enable others skilled in the art to which it pertains to make and use the same, reference being had to the accompanying drawings, which form a part of this specification.

This invention relates to steam-traps, and has for its object an improved means for actuating the valves of steam-traps.

Figure 1:
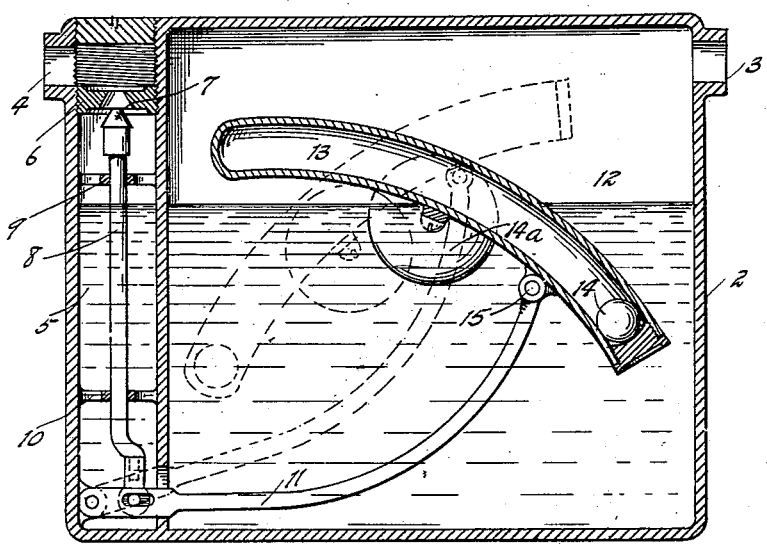
Figure 2:
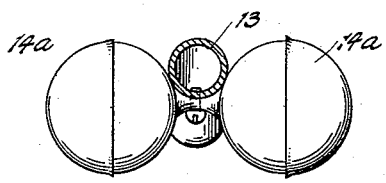

In the drawings, Figure 1 is a sectional elevation showing the trap, the valve, and the means for actuating it. Fig. 2 is an elevation of the float.

2 indicates the casing of the trap, having a steam-inlet 3 and outlet 4, a passage 5, provided with a cross-diaphragm 6, which contains a valve-orifice.

7 indicates a valve arranged to seat on the diaphragm 6. This valve is provided with a stem 8, that is guided through supports 9 and 10. To the end of the valve-stem 8 is connected a lever 11, which extends into the chamber 12 of the trap and supports, at that end which lies to the highest part, a tube 13, preferably somewhat curved and preferably attached pivotally to the end of the lever 11. Within the tube is a weight 14, arranged to occupy the lower end of the tube and to roll from the higher end to the lower end whenever the position of the tube is changed so as to change the relative altitude of the ends. Under the tube and arranged to be held practically under the middle of the tube is a float 14$^a$, upon which the tube rests. The pivotal connection 15 between the tube and the lever 11 and the connection of the tube 13 and the float 14$^a$ are so arranged that a small variation in height of the float changes the relative altitude of the two ends of the tube, changing it from the position shown in full lines to the position shown in dotted lines. The weight 14, when in the position shown in full lines, acts as a weight to depress the end of the lever 15 and draws down the valve 7 from its seat, leaving the orifice open for the escape of fluid in the trap, and the tube takes this position when the fluid in the trap has reached a height such that it is desired to have the trap emptied. As the fluid falls, the float falls until the obliquity of the tube is shifted and the ball rolls to the end opposite to that in which it is shown in full lines, and the ball is now supported by the float and no longer acts as a weight to depress the end of the lever 11.

The device is quick-acting and acts with certainty.

What I claim is—

1. In a steam-trap, a valve-actuator consisting of a lever, a weight-guide pivoted to the lever and supported by the lever and a float, a weight shiftable along the guide and a float arranged to actuate the guide to shift the weight, substantially as described.

2. In a steam-trap, in combination with a valve and a lever pivotally connected therewith, a weight-guide supported by a float and the lever and pivotally connected to said lever, a weight shiftable along said guide, a floating support for said guide engaging therewith and arranged to turn the guide on its pivot, substantially as described.

3. In a steam-trap, in combination with a valve and a lever adapted to actuate the same, a weight-guide pivoted to the lever, a float-support secured to the weight-guide and acting in conjunction with the lever to support the weight-guide, a weight shiftable along said guide and arranged to pass the connection between the weight-guide and the lever, whereby the weight is adapted to act either in opposition to or in conjunction with said float, substantially as described.

4. In combination with a tank, a valve for the same, a lever pivotally connected to the tank and to a stem of the valve, a float, a weight-guide supported by the lever, the float, a weight shiftable along said guide from a position at one side beyond the lever to a position at the other side beyond the float, substantially as described.

In testimony whereof I sign this specification in the presence of two witnesses.

FREDERICK F. BRUSH.

Witnesses:
 MAY E. KOTT,
 C. F. BURTON.